(12) United States Patent
Buckley et al.

(10) Patent No.: US 9,169,969 B2
(45) Date of Patent: Oct. 27, 2015

(54) MOUNTING SCREW RETENTION FEATURE FOR A HOUSING OF AN ELECTRONIC DEVICE

(71) Applicant: Honeywell International Inc., Morristown, NJ (US)

(72) Inventors: Mark C. Buckley, Pollock Pines, CA (US); John Kovach, Shoreham, NY (US); Joe Lu, Guangdong (CN)

(73) Assignee: Honeywell International Inc., Morristown, NJ (US)

( * ) Notice: Subject to any disclaimer, the term of this patent is extended or adjusted under 35 U.S.C. 154(b) by 215 days.

(21) Appl. No.: 14/031,773

(22) Filed: Sep. 19, 2013

(65) Prior Publication Data

US 2015/0075858 A1     Mar. 19, 2015

(51) Int. Cl.
*H02G 3/10* (2006.01)
*F16M 13/02* (2006.01)

(52) U.S. Cl.
CPC .............. *F16M 13/025* (2013.01); *H02G 3/10* (2013.01)

(58) Field of Classification Search
CPC ........... H02G 3/08; H02G 3/081; H02G 3/10; F16M 13/025; H05K 5/00; H05K 5/02; H05K 5/04

USPC ......... 174/480, 481, 50, 53, 57, 58, 492, 559, 174/54; 220/3.2–3.9, 4.02; 248/200, 220.1, 248/220.21, 906; 312/223.1, 223.2
See application file for complete search history.

(56) References Cited

U.S. PATENT DOCUMENTS

| | | | |
|---|---|---|---|
| 5,349,134 A * | 9/1994 | Russell ......................... | 174/492 |
| 6,484,983 B1 * | 11/2002 | Combest .................... | 248/220.1 |
| 6,494,425 B2 * | 12/2002 | Soloway et al. ................ | 174/54 |
| 6,943,295 B2 * | 9/2005 | Herth .............................. | 174/58 |
| 6,956,168 B2 * | 10/2005 | Herth .............................. | 174/53 |
| 7,654,784 B2 | 2/2010 | Daggers et al. | |
| 7,858,878 B2 * | 12/2010 | Garavuso et al. ............... | 174/58 |
| 8,894,161 B2 * | 11/2014 | Herreid et al. ............. | 312/223.2 |

* cited by examiner

*Primary Examiner* — Angel R Estrada
(74) *Attorney, Agent, or Firm* — Wood, Phillips, Katz, Clark & Mortimer

(57) ABSTRACT

A corner mountable housing (10) is provided for encasing an electronic device and for mounting the electronic device in a corner (12) of a wall or other mount surface (14) via at least one fastener (16) extending through the housing (10) to engage the corner (12). The housing (10) includes a surface-mountable housing portion (20) in the form of a rear cover, with the housing portion (20) being a one-piece molded construction and having first and second fastener retention features (22) and (24) formed therein.

20 Claims, 6 Drawing Sheets

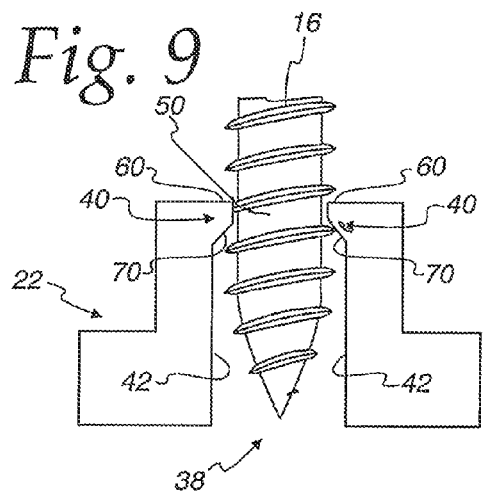
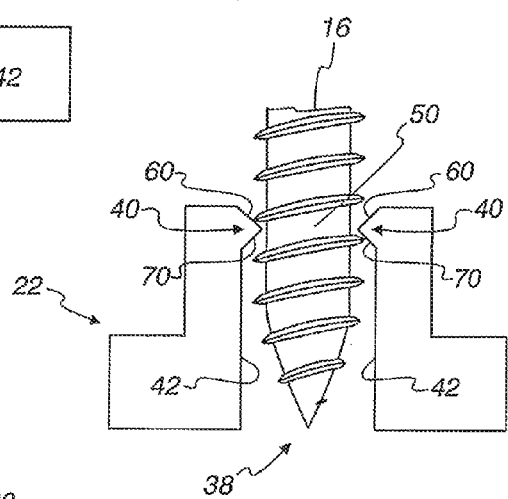
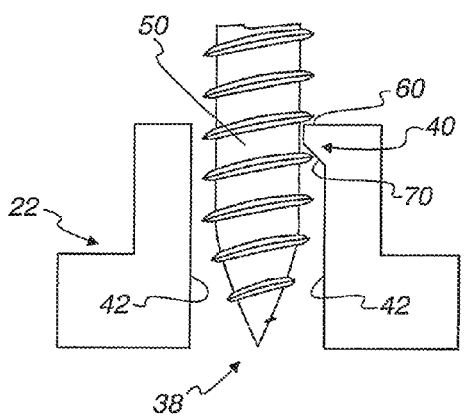
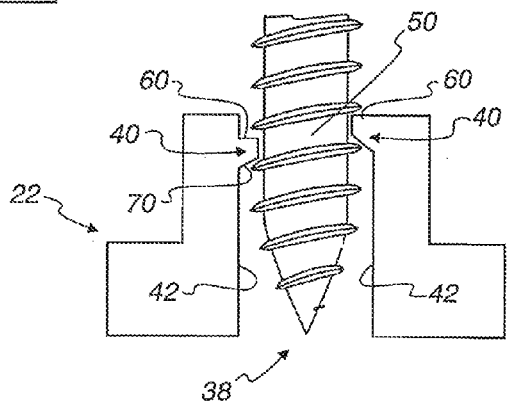

MOUNTING SCREW RETENTION FEATURE FOR A HOUSING OF AN ELECTRONIC DEVICE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This application relates to housings for surface-mountable devices, and in more particular applications to housings for surface mountable electronic devices, such as for example, security devices, and to the corner mounting of such housings.

BACKGROUND

Devices such as security devices (passive infrared sensors (PIRs), motion sensors, sirens etc), thermostats, meters, lighting fixtures, and the like are typically mounted on a wall or ceiling surface. Installers need to hold mounting screws in one hand as well as the housing to be installed while climbing a ladder, making it difficult as well as unsafe. Once up on the ladder, the installer will typically hold the housing in place by pressing it against the wall with the side or heal of one hand, while also holding a screw between the index finger and thumb of the same hand, and then driving the screw into the wall with a power driver or drill in the other hand. This awkward process will typically be repeated for at least one additional screw. If the housing is not perfectly vertical and/or horizontal after driving the screws into the wall, it is desirable to have the ability to adjust the orientation. In addition, it is desirable for the screw receiving feature of the housing to be robust, as sometimes the force applied by the driver is not directly in-line with the screw and the screw may be pushed out of its most desired location before entering the wall.

For corner mount installations, at least part of the above concerns are successfully addressed by the structure shown in U.S. Pat. No. 7,654,784, naming Ray Daggers and John Kovach as inventors. This patent teaches the application of a screw retention feature in the rear cover of the housing that will hold the screws in place in the rear cover so the installer can climb the ladder with a housing/screw assembly versus a number of loose parts. The installer can then firmly and comfortably hold the rear cover in position with one hand while driving the screws with a power driver in the other hand. However, the disclosed feature does not allow for a final fine tune adjustment vertical and/or horizontal orientation of the housing, nor is the feature as tolerant of driver to screw force misalignment as may often be desired.

As seen from above, there is always room for improvement in connection with the mounting features of surface mountable housings for electronic devices.

SUMMARY

In accordance with one feature of this disclosure, a corner mountable housing is provided for encasing an electronic device and mounting the electronic device in a corner of a wall or other mount surface via at least one fastener extending through the housing to engage the corner. The housing includes a surface-mountable housing portion, with the housing portion having a first fastener retention feature formed therein. The retention feature is defined by a slot extending inwardly from an exterior corner surface of the housing portion to at least one fastener holding rib extending from a side wall of the slot toward an opposite side wall of the slot, the at least one rib extends along the side wall to define a fastener engaging opening. The fastener engaging opening has a length and a width perpendicular to the length, with the length being larger than the width. The side walls have a depth extending from the rib to the exterior corner surface perpendicular to both the length and the width of the fastener engaging opening, the depth of each of the side walls being larger than the width of the fastener engaging opening.

In one feature, the at least one fastener holding rib is a pair of fastener holding ribs, each rib extending from a side wall of the slot towards an opposite side wall of the slot.

As one feature, the pair of fastener ribs lay in a common plane parallel to the length and width of the fastener engaging opening.

According to one feature, the pair of ribs are staggered out of plane relative to each other.

In one feature, the at least one rib and the length of the fastener engaging opening extend parallel to a longitudinal axis.

As one feature, the width of the fastener engaging opening is uniform over the length of the fastener engaging opening.

In one feature, the length of the fastener engaging opening is at least two times larger than the width.

As one feature, the depth of each of the side walls is at least two times larger than the width of the fastener engaging opening.

According to one feature, the exterior corner surface extends at a 45 degree angle relative to a planar exterior surface of the housing that extends from the exterior corner surface.

In one feature, the side walls are planar and separated from each other by a uniform width over the depth of the side wall.

According to one feature, the uniform width separating the side walls extends over the length of the fastener engaging opening.

As one feature, at least one of the at least one ribs has a fastener stop surface facing away from the exterior corner surface of the housing portion and extending in a plane parallel to the length of the fastener engaging opening and parallel to the width of the fastener engaging opening.

According to one feature, the housing portion is a one-piece molded construction and further includes a removable wall portion overlaying the fastener engaging opening and extending adjacent the stop surfaces.

In one feature, the housing portion further includes a second fastener retention feature spaced from the first fastener retention feature. The second fastener retention feature has a fastener engaging opening with a length separated by a width, with the length of the fastener engaging opening of the second fastener retention feature extending parallel to the length of the fastener engaging opening of the first fastener retention feature.

As one feature, the first and second fastener retention features have identical constructions.

According to one feature, the first fastener retention feature is configured to retain a threaded fastener having a preferred major thread diameter, the length of the fastener engaging opening is two to four times larger than the preferred major thread diameter, and the side walls of the slot are separated by a width that is 5 to 15 percent larger than the preferred major thread diameter.

As one feature, the depth of the side walls is four to six times greater than a preferred thread pitch for a threaded fastener intended for use with the first fastener retention feature.

In one feature, the width of the fastener engaging opening is less than the preferred major thread diameter, each of the at least one ribs has a thickness extending perpendicular to both the length and the width of the fastener engaging opening, and the thickness of each rib is less than or equal to the preferred thread pitch and greater than or equal to one-half of the preferred thread pitch.

As one feature, the housing is combined with a threaded fastener having the preferred major thread diameter and the preferred thread pitch.

According to one feature, the housing includes a second fastener retention feature spaced from the first fastener retention feature, the first and second fastener retention features having identical constructions.

Other features and advantages will become apparent from a review of the entire specification, including the appended claims and drawings.

BRIEF DESCRIPTION OF THE DRAWINGS

FIGS. 9-12 are views similar to FIG. 6, but with each figure showing an alternate embodiment of a fastener engaging feature of the rear cover portion.

DETAILED DESCRIPTION

Figure 1:
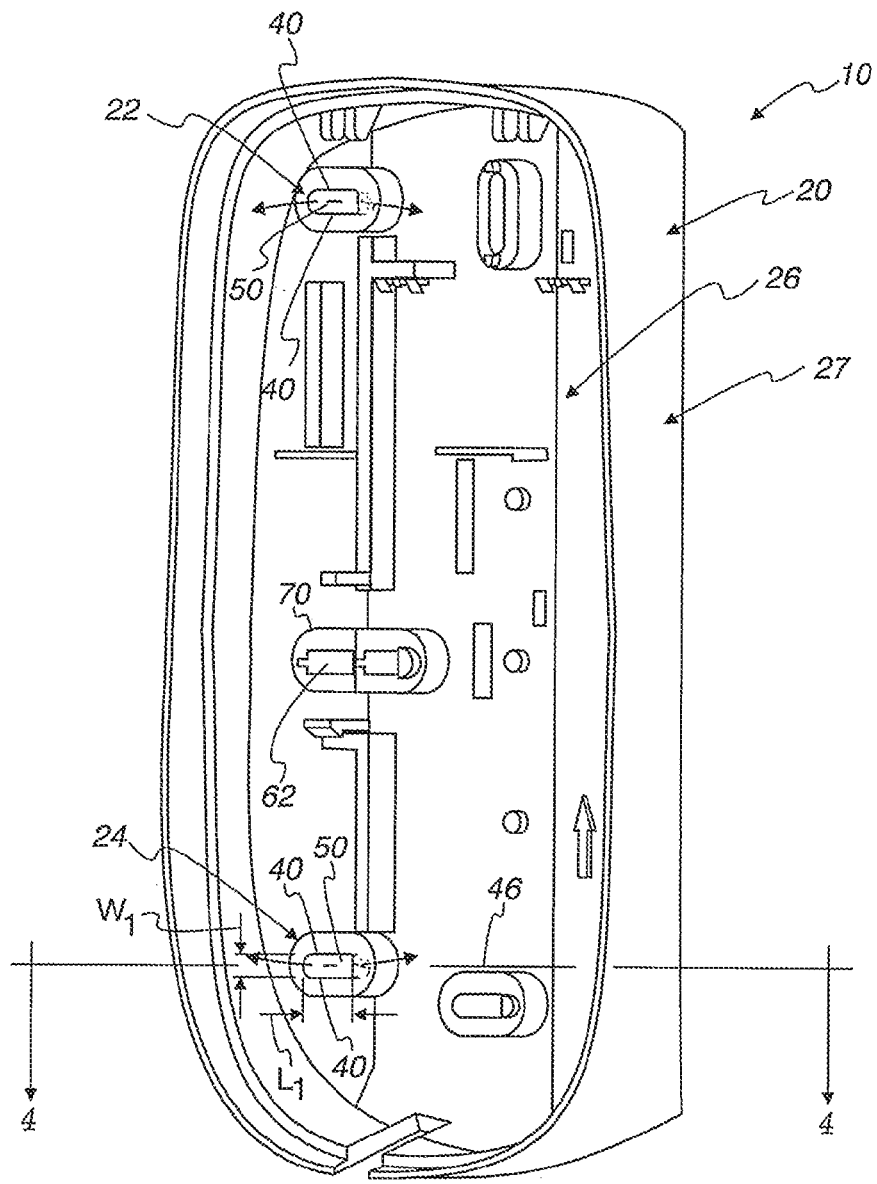
FIG. 1 is a perspective view from above of a rear cover portion of a surface mountable housing for encasing an electronic device.
Figure 2:
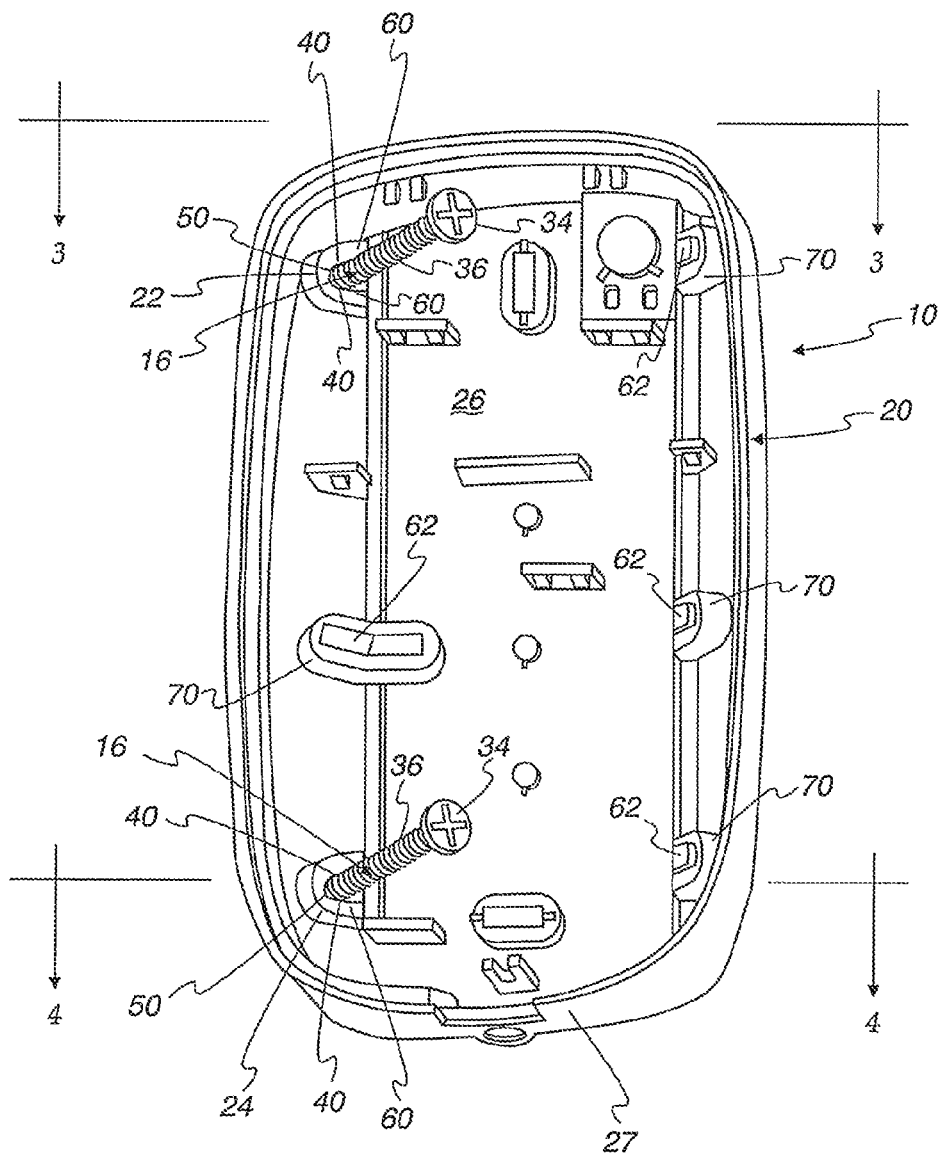
FIG. 2 is a perspective view from above of the rear cover portion of FIG. 1 and further showing a pair of fasteners in the form of screws assembled with the rear cover portion in preparation for mounting the cover to a surface.

As best seen in FIGS. 1-4, a corner mountable housing 10 is provided for encasing an electronic device (not shown herein) such as a security device (PIRs, motion sensors, sirens, etc.), thermostat, meter, lighting fixture, and the like, and for mounting the electronic device in a corner 12 (shown in FIG. 7) of a wall or other mount surface 14 via at least one fastener 16 extending through the housing 10 to engage the corner 12. The housing 10 includes a surface-mountable housing portion 20 in the form of a rear cover (other portions of the housing 10 have not been illustrated herein), with the housing portion 20 being a one-piece molded construction and having first and second fastener retention features 22 and 24 formed therein. It will be understood by those skilled in the art that the particular type and details of the electronic device are not critical to the features claimed in this disclosure, that the features claimed in this disclosure can be used with a wide variety of electronic devices, that other portions of the housing 10 will be highly dependent upon the particular type and details of the particular electronic device used with the features claimed herein, and that the details of such other portions of the housing 10 are not critical to the features claimed in this disclosure. Accordingly, an electronic device and other portions of the housing 10 have not been shown herein. It should further be understood that while the surface-mountable housing portion 20 is illustrated in the drawings as being a one-piece molded construction, in some applications it may be desirable for the surface-mountable housing portion 20 to be made from multiple pieces that are subsequently assembled together to form the surface-mountable housing portion 20, and in some cases it may be desirable for the first fastener retention feature 22 to be formed in a separate one of the pieces from the second fastener retention feature 24.

Figure 3:
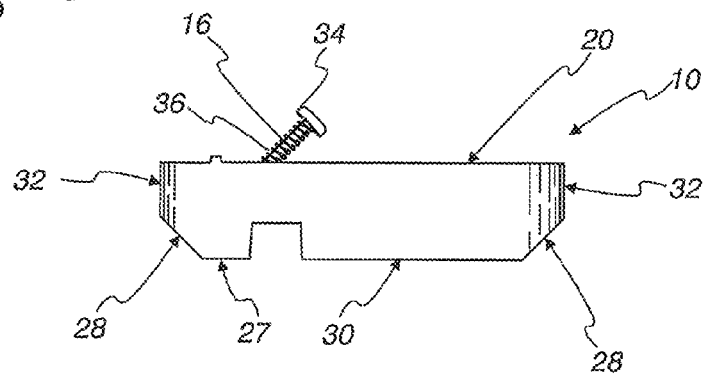
FIG. 3 is an end elevational view of the rear cover portion taken from line 3-3 in FIG. 2.
Figure 7:
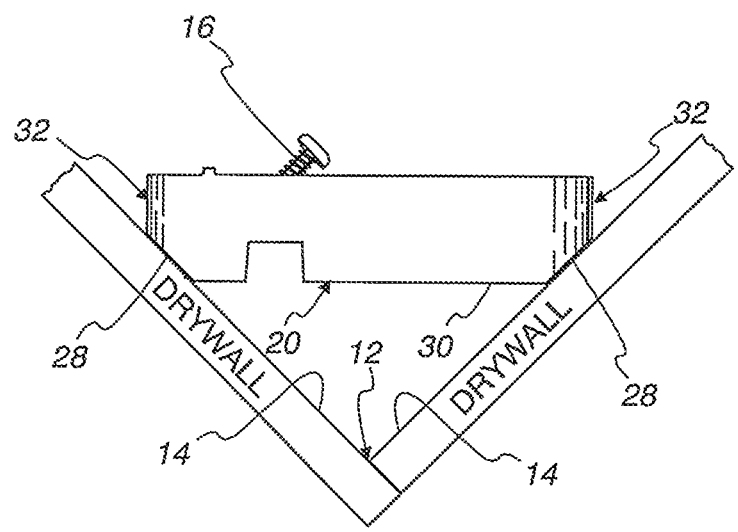
FIG. 7 is a view similar to FIG. 3, but showing the rear cover portion installed in a corner of a wall.
Figure 8:
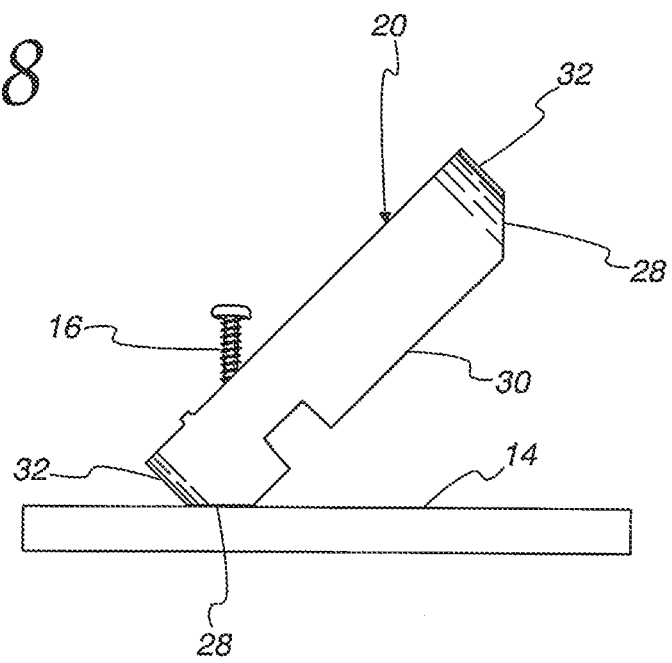
FIG. 8 is a view similar to FIG. 7, but showing the rear cover portion installed in a angle mount installation on a flat wall.

The housing portion 20 includes an interior side 26 that faces an electronic device encased in the housing, and an exterior side 27 that faces the exterior environment and the surface to which the housing portion 20 is mounted. In this regard, as best seen in FIGS. 3, 4, 7 and 8, the exterior side 27 of the housing portion 20 includes a pair of exterior corner surfaces 28, a bottom surface 30 extending between the corner surfaces 28, and a pair of side surfaces 32, each extending from one of the corner surfaces 28. In the illustrated embodiment and as best seen in FIGS. 3, 7 and 8, the surfaces 28 and 30 are planar, with the exterior corner surfaces 28 extending at a 45 degree angle relative to the surface 30. While this geometry for the surfaces 28 and 30 will be very suitable for most applications where the housing portion 20 is mounted in a typical corner of a wall or other structure, it should be understood that other geometries may be desirable and are possible within the scope of this disclosure depending upon the particular requirements associated with the use of the housing portion 20. For example, in some applications it may be desirable for one or more of the surfaces 28 and 30 to have a curved or other non-planar shape, and/or for all or some of the surfaces 28, 30 and 32 to extend at angles relative to each other that are different than those illustrated herein.

Figure 4:
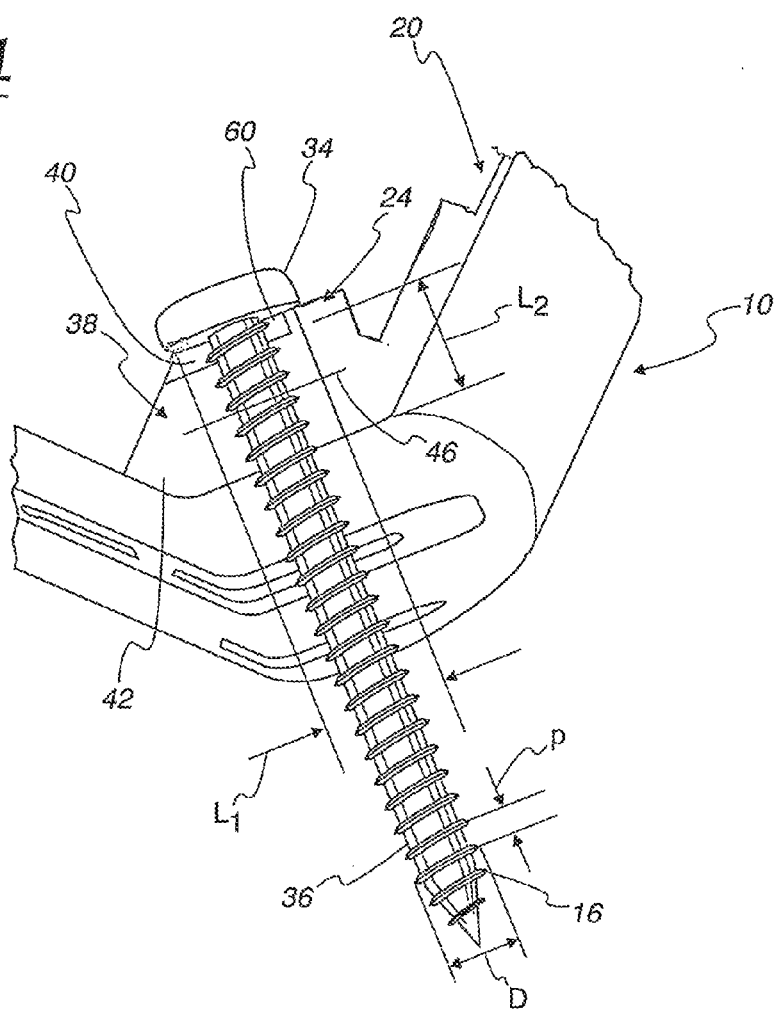
FIG. 4 is an enlarged perspective view taken along line 4-4 in FIG. 2.

In many applications, the fasteners 16 used with the housing portion 10 will be provided in the form of threaded fasteners 16 having a head portion 34 and a threaded shank portion 36 with a preferred major thread diameter D and a preferred thread pitch P, such as the fasteners 16 illustrated in the figures and best seen in FIG. 4. In this regard, it should be understood that the preferred major thread diameter D and the preferred thread pitch P can vary from application to application depending on each applications particular requirements of the application. It is also contemplated that the fasteners 16 will be provided with the housing portion 20. While threaded fasteners 16 will often be the most suitable, it should be understood that other types of fasteners, such as, for example, rivets, expandable plugs, and the like, may be desirable depending upon the requirements of a particular application and can be used with the housing portion 20.

Figure 5:
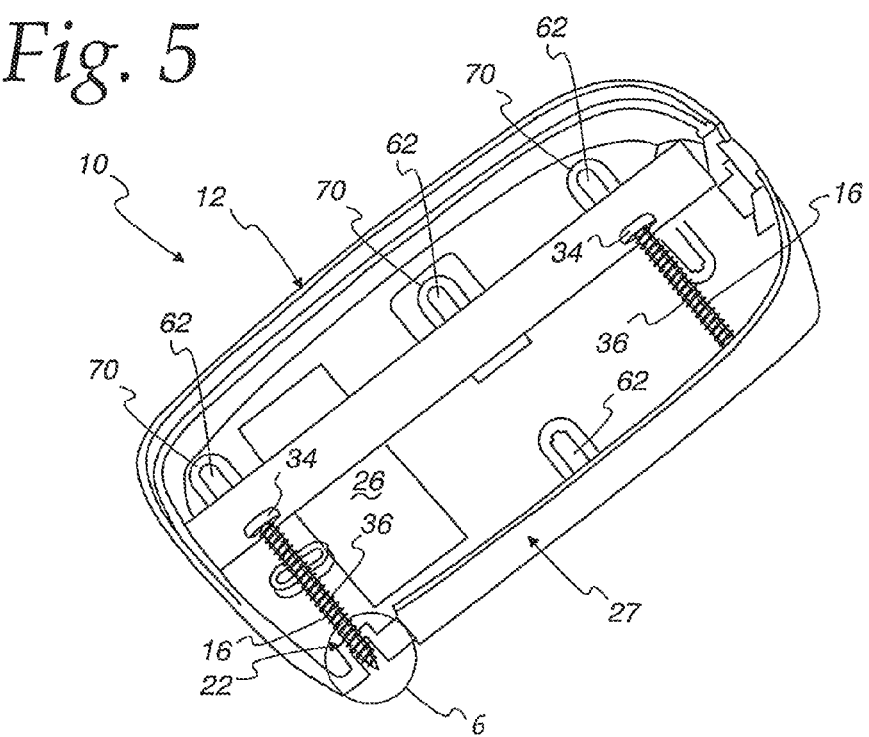
FIG. 5 is another perspective view from an opposite side of the rear cover portion of FIGS. 1-4, with part of the rear cover portion broken away so as to better illustrate a fastener retention feature in the rear cover.
Figure 6:
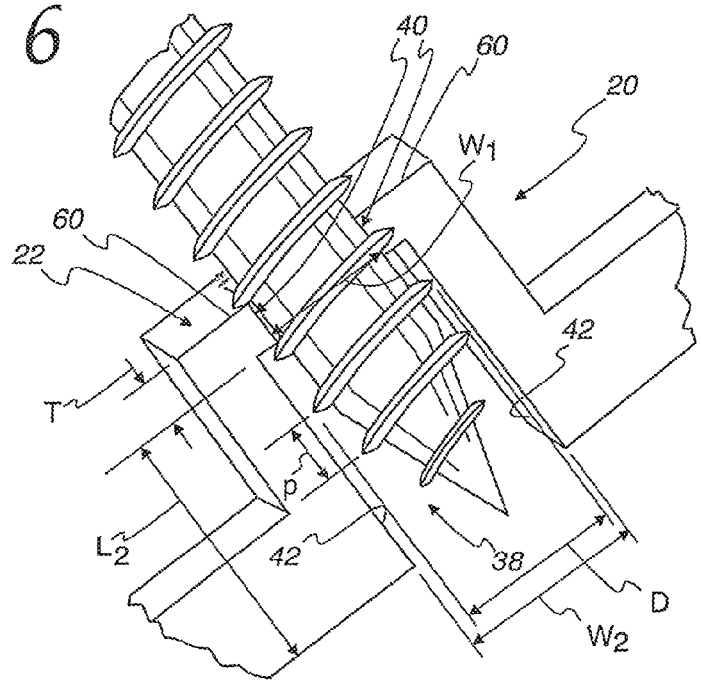
FIG. 6 is an enlarged view of the portion 6-6 encircled in FIG. 5.

As best seen in FIGS. 4-6, each retention feature 22, 24 is defined by a slot 38 extending inwardly from the exterior corner surface 28 of the housing portion 20 to a pair of fastener holding ribs 40 extending towards each other from opposite side walls 42 of the slot 38. With reference to FIGS. 1, 4 and 6, the ribs 40 extend along the side walls 42 parallel to a longitudinal axis 46 to define a fastener engaging opening 50 between the ribs 40, with the fastener engaging opening 50 having a length $L_1$ parallel to the longitudinal axis 46 and a width. $W_1$ perpendicular to the longitudinal axis 46. As best seen in FIG. 1, in the illustrated embodiment of the housing portion 20, the width $W_1$ is uniform over the length $L_1$, and the length $L_1$ is at least two times larger than the width $W_1$. As best seen in FIG. 4, the side walls 42 have a length $L_2$ extending from the ribs 40 to the exterior corner surface 28 perpendicular to both the length $L_1$ and the width $W_1$ of the fastener engaging opening 50. In the illustrated embodiment, the length $L_2$ of each of the side walls 42 is at least two times larger than the width $W_1$ of the fastener engaging opening 50.

As best seen in FIG. 6, in the illustrated embodiment, the side walls 42 are planar and separated from each other by a width $W_2$ over the length $L_2$ of the side walls 42. Furthermore, again in the illustrated embodiment, the width $W_2$ extends over the length $L_1$ of the fastener engaging opening 50 so that the side walls 42 are essentially parallel to each other except for any slight mold form taper required for manufacture of the housing portion 20.

As best seen in FIGS. 4 and 6, each of the ribs 40 has a fastener stop surface 60 facing away from the exterior corner surface 28 of the housing portion and extending in a plane perpendicular to the length $L_1$ of the fastener engaging opening 50 and parallel to the width $W_1$ of the fastener engaging opening 50. As best seen in FIG. 4, the stop surfaces 60 (only one shown in FIG. 4) abut the head portion 34 of the fastener 16 when the fastener 16 is driven into a corner 12. The housing portion 20 can further include one or more removable wall portions, such as knock-outs 62, that can overlay the fastener engaging opening 50 and extend adjacent the stop surfaces 60.

In the illustrated embodiment, the fastener retention features 22 and 24 are each configured to retain a threaded fastener 16 having a preferred major thread diameter D and a preferred thread pitch P, and it will often prove desirable for the length $L_1$ of the fastener engaging opening 50 to be two to four times larger than the preferred major thread diameter D, and for the side walls 42 of the slot 38 to separated by a width $W_2$ that is 5 to 15 percent larger than the preferred major thread diameter D. Additionally, it will often be desirable for the length $L_2$ of the side walls 42 to be four to six times greater than the preferred thread pitch P. This structure allows for the fastener to be sufficiently engaged with the feature 22,24 so as to maintain proper alignment of the fastener 16 while still maintaining the penetrating end of the fastener 16 entirely within the slot 38 so that the penetrating end of the fastener 16 does not interfere with a wall surface or corner during installation and prior to the fastener 16 being engaged with a wall or corner by an installer. As best seen in FIG. 6, the width $W_1$ of the fastener engaging opening 50 is less than the preferred major thread diameter D so that the threads of the fastener 16 engage into the ribs 40. Further in this regard, it will often be desirable for each of the ribs 40 to have a thickness T extending perpendicular to both the length $L_1$ and the width $W_1$ of the fastener engaging opening 50, with the thickness T of each rib 40 being less than or equal to the preferred thread pitch P and greater than or equal to one-half of the preferred thread pitch P so that a portion of the threads of the fastener 16 straddle at least part of one of the ribs 40 as shown in FIG. 6. This advantageously retains the fastener 16 in the opening 50 while allowing the opening 50 in the slot 38 to move relative to the fastener 16 after the fastener 16 is engaged with a corner 12 but not fully tightened. While the above geometry has proved advantageous, it should be understood that other geometries may be desirable depending upon the particular requirements of the application and the type of fastener used.

As best seen in FIG. 7, the surface mountable housing portion 20 can be mounted in a corner 12, with each of the corner surfaces 28 engaged against one of the two wall surfaces 14 that form the corner 12 and the fasteners 16 extending through the fastener retention features 22 and 24 to engage at least one of the wall surfaces 14. An alternate, so-called "angle mount" installation is shown in FIG. 8 wherein one of the corner surfaces 28 is engaged against a wall surface 14 with the housing portion 20 extending at an angle from the wall surface 14.

FIGS. 9-12 illustrate various alternate embodiments for the fastener retention features 22 and 24, with FIG. 9 illustrating an embodiment wherein an exterior facing surface 70 of each of the ribs 40 is angled so that each rib 40 convergingly tapers as it extends from the corresponding side wall 42 to the opening 50 so as to provide a more limited thread interference than the embodiment shown best in FIGS. 4 and 6. FIG. 10 shows an embodiment similar to the embodiment of FIG. 9 but having the interior surface 60 of each rib 40 also angled so as to provide a taper on both sides of the ribs 40 which eliminates thread interference with the preferred fastener 16 but still allows retention of the fastener 16 by the features 22 and 24. FIG. 11 shows an embodiment wherein one of the ribs 40 has been eliminated from the fastener retention feature 22,24 and the other rib 40 is tapered the same as the ribs 40 in FIG. 9, with the side wall 42 spaced opposite the rib 40 so as to retain the fastener 16. FIG. 12 illustrates an embodiment wherein one of the ribs 40 has been staggered relative to the other rib 40 and both ribs 40 provided with a taper similar to the ribs 40 in FIG. 9, but with the staggered offset of the ribs 40 allowing the retention feature 22,24 to retain the fastener 19 without any thread interference.

As seen from the foregoing, this disclosure provides recessed fastener retention features 22 or 24, each having a slot 38 that can extend either horizontally or vertically depending on the orientation of the housing portion 20 when installed. Each fastener retention feature 22 and 24 allows the fastener 16 to be pushed or threaded into the engagement feature 22,24 thereby providing fastener retention in the housing portion 20 that holds the fastener 16 in position for an installer. The slots 38 allow the housing portion 20 to be vertically and/or horizontally adjusted, as illustrated by the arrows A in FIG. 1, after the fastener 16 has been engaged in the wall but not fully tightened. More specifically, the installer can drive both screws 16 held in the retention features 22 and 24 into the corner 12 and stop just as the screw heads 34 come into contact with the ribs 40. The installer can then rotate and adjust the housing portion 20 with the slots 38 moving relative to the fasteners 16 until the housing portion 20 is aligned vertical and/or horizontal. Once the desired alignment is achieved, the installer can tighten both fasteners 16 to finalize installation. It should further be appreciated that the fastener retention features 22 and 24 can be very robust and can maintain the fasteners 16 in proper alignment when the fasteners 16 are assembled with the housing portion 20 as shown in FIGS. 2, 3, 5, 6 and 9-12.

It should be appreciated that while specific embodiments are shown herein for the housing portion 20 and fastener retention features 22 and 24, the scope of this disclosure is only limited by the structure expressly recited in the claims and it may be desirable to combine one or more aspects of the fastener retention features 22,24 and the housing portion 20 with all or only selected other ones of the other aspects of the fastener retention features 22,24 and housing portion 20 depending upon the requirements of each particular application. For example, while only two of the fastener retention features 22 and 24 have been described herein, it is possible for the housing portion 20 to have just one of the fastener retention features 22,24 or more than two of the fastener retention features 22 and 24, as illustrated by the additional fastener retention features 70 shown in FIGS. 1 and 2. By way of further example, it may be desirable for some of the surfaces described herein to be curved or otherwise shaped rather than provided in the planar form shown in the illustrated embodiment. As yet a further example, it may be desirable in some applications for some of the surfaces that are illustrated herein as extending parallel (or essentially parallel) to each other to be provided in an altered form wherein they do not extend parallel to each other. Furthermore, while some of the widths, and/or lengths, and/or thicknesses of the features are illustrated herein as being uniform, in some applications it may be desirable for one or more of the illustrated widths, lengths and/or thicknesses to be non-uniform. Other examples of alternate configurations can be seen by a review of the appended claims.

The invention claimed is:

1. A corner mountable housing for encasing an electronic device and mounting the electronic device in a corner of a wall or other mount surface via at least one fastener extending through the housing to engage the corner, the housing comprising:

a surface-mountable housing portion, the housing portion having a first fastener retention feature formed therein, the retention feature defined by a slot extending inwardly from an exterior corner surface of the housing portion to at least one fastener holding rib extending from a side wall of the slot toward an opposite side wall of the slot, the at least one rib extending along the side wall to define a fastener engaging opening, the fastener engaging opening having a length and a width perpendicular to the length, the length being larger than the width, the side walls having a depth extending from the rib to the exterior corner surface perpendicular to both the length and the width of the fastener engaging opening, the depth of each of the side walls being larger than the width of the fastener engaging opening.

2. The housing of claim 1 wherein the at least one fastener holding rib is a pair of fastener holding ribs, each rib extending from a side wall of the slot towards an opposite side wall of the slot.

3. The housing of claim 2 wherein the pair of fastener ribs lay in a common plane parallel to the length and width of the fastener engaging opening.

4. The housing of claim 2 wherein the pair of ribs are staggered out of plane relative to each other.

5. The housing of claim 1 wherein the at least one rib and the length of the fastener engaging opening extend parallel to a longitudinal axis.

6. The housing of claim 1 wherein the width of the fastener engaging opening is uniform aver the length of the fastener engaging opening.

7. The housing of claim 6 wherein the length of the fastener engaging opening is at least two times larger than the width.

8. The housing of claim 1 wherein the depth of each of the side walls is at least two times larger than the width of the fastener engaging opening.

9. The housing of claim 1 wherein the exterior corner surface extends at a 45 degree angle relative to a planar exterior surface of the housing that extends from the exterior corner surface.

10. The housing of claim 1 wherein the side walls are planar and separated from each other by a uniform width over the depth of the side wall.

11. The housing of claim 10 wherein the uniform width separating the side walls extends over the length of the fastener engaging opening.

12. The housing of claim 1 wherein at least one of the at least one ribs has a fastener stop surface facing away from the exterior corner surface of the housing portion and extending in a plane parallel to the length of the fastener engaging opening and parallel to the width of the fastener engaging opening.

13. The housing of claim 12 wherein the housing portion is a one-piece molded construction and further comprises a removable wall portion overlaying the fastener engaging opening and extending adjacent the stop surfaces.

14. The housing of claim 1 wherein the housing portion further comprises a second fastener retention feature spaced from the first fastener retention feature, the second fastener retention feature having a fastener engaging opening with a length separated by a width, the length of the fastener engaging opening of the second fastener retention feature extending parallel to the length of the fastener engaging opening of the first fastener retention feature.

15. The housing of claim 14 wherein the first and second fastener retention features have identical constructions.

16. The housing of claim 1 wherein the first fastener retention feature is configured to retain a threaded fastener having a preferred major thread diameter, the length of the fastener engaging opening is two to four times larger than the preferred major thread diameter, and the side walls of the slot are separated by a width that is 5 to 15 percent larger than the preferred major thread diameter.

17. The housing of claim 16 wherein the depth of the side walls is four to six times greater than a preferred thread pitch for a threaded fastener intended for use with the first fastener retention feature.

18. The housing of claim 17 wherein the width of the fastener engaging opening is less than the preferred major thread diameter, each of the at least one ribs has a thickness extending perpendicular to both the length and the width of the fastener engaging opening, and the thickness of each rib is less than or equal to the preferred thread pitch and greater than or equal to one-half of the preferred thread pitch.

19. The housing of claim 18 in combination with a threaded fastener having the preferred major thread diameter and the preferred thread pitch.

20. The housing of claim 18 further comprising a second fastener retention feature spaced from the first fastener retention feature, the first and second fastener retention features having identical constructions.

* * * * *